Nov. 22, 1927.
W. H. PAULL
1,649,922
MANUFACTURE OF RIMS
Filed March 24, 1927
2 Sheets-Sheet 1
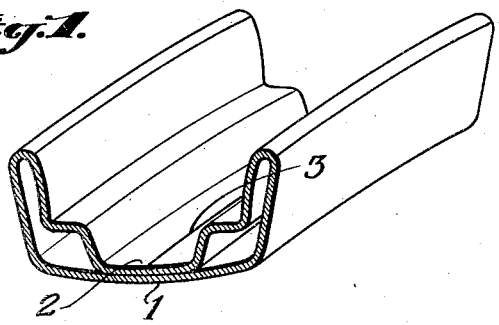
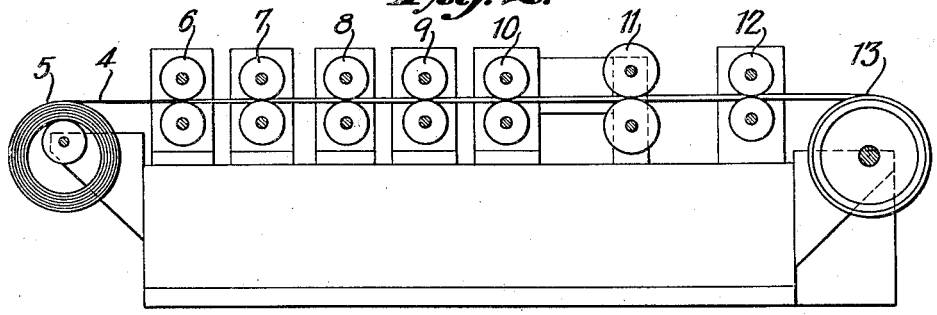
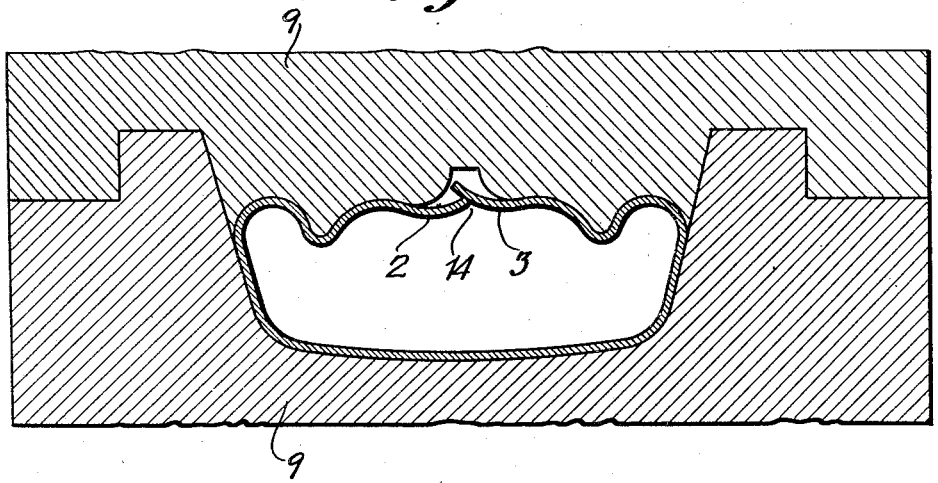
Inventor
Wallace Henry Paull
By his Attorney Nov. 22, 1927.                                            1,649,922
W. H. PAULL
MANUFACTURE OF RIMS
Filed March 24, 1927                        2 Sheets-Sheet 2

Inventor
Wallace Henry Paull
By his Attorney

Patented Nov. 22, 1927.

1,649,922

UNITED STATES PATENT OFFICE.

WALLACE HENRY PAULL, OF ERDINGTON, BIRMINGHAM, ENGLAND, ASSIGNOR TO THE DUNLOP RUBBER COMPANY, LIMITED, OF BIRMINGHAM, ENGLAND, A BRITISH CORPORATION.

MANUFACTURE OF RIMS.

Application filed March 24, 1927, Serial No. 178,075, and in Great Britain December 11, 1925.

This invention relates to improvements in the manufacture of rims which are so formed that the sides thereof present a flat, or approximately flat, surface for application of rim brakes.

According to this invention, I construct such a rim from a flat strip of metal, rolling or otherwise forming the same to the required section, bringing the respective peripheral edges into contact, preferably in the form known as a butt joint, and electrically welding the same together and to the base of the rim.

In order that the said invention may be clearly understood and readily carried into effect the same will now be described with reference to the accompanying drawings, in which—

Fig. 1 illustrates a section of one form of rim according to this invention;

Fig. 2 is a diagrammatic illustration of one form of machine for forming rims according to this invention;

Figs. 3 and 4 are detail views illustrating different rolling operations;

In cross-section the rim is preferably formed as shown in Fig. 1 flat or approximately flat at the base 1 thereof, the respective peripheral edges 2 and 3 contacting the said base over a comparatively substantial length transversely therefor.

Figure 5:
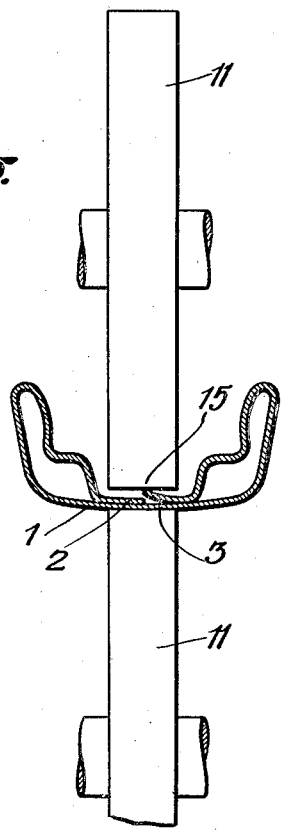
Fig. 5 illustrates the welding operation.

This construction is preferred because it facilitates the welding operation, which is preferably performed by passing electric current between electrodes shown at 11 in Figs. 2 and 5 and hereinafter referred to more fully, which are adapted to press the said peripheral edges of the rim into intimate contact with the base 1 thereof.

Rims according to this invention may be formed in any convenient manner but a machine for carrying out the preferred method is illustrated diagrammatically in Fig. 2. The flat metal strip 4 from which the rim is made is fed from a roll 5 thereof between various forming rollers 6, 7, 8, 9 and 10 whereby it is given the required cross-section. From the rollers 10 it passes between the welding electrodes 11 and from thence between ironing or final shaping rollers 12 to the power operated batching drum 13 whereupon it is wound helically and from whence it is cut into the required lengths each for the forming of a separate rim.

A feature of this invention lies in the means whereby I obviate the possibility of the electrodes 11 separating the peripheral edges 2 and 3 of the rim during the welding operation. Hitherto in butt and seam welding it has been the practice to bring the opposing edges of the seam into close contact comparatively loosely—the metal thereof being in a comparatively static condition. It is not an unusual occurrence for the electrodes to separate slightly the said edges during welding and to obviate this possibility I provide means to ensure that the metal of the said edges shall be under a certain compression—thereby forcing the edges of the seams together under pressure—before the welding operation.

As shown in Fig. 3 the rolling operation prior to the final pre-welding formation of the rim is carried out by rollers 9 suitably shaped to cause the peripheral edges 2 and 3 of the rim to be considerably overlapped as shown at 14 in Fig. 3. The final pre-welding operation is carried out by the rollers 10 which are suitably shaped as shown in Fig. 4—wherein the pre-welding operation is illustrated only partly finished—to press the said edges into abutting contact.

Thereby is provided a considerable pressure between the said opposing edges and thus, should the electrodes 11 tend to separate the said edges during welding, the result will be merely a diminution of the said pressure and not an actual separation of the said edges. The continuance of the operation of welding restores the static condition of the material of the rim by fusion of the contacting surfaces.

Figure 4:
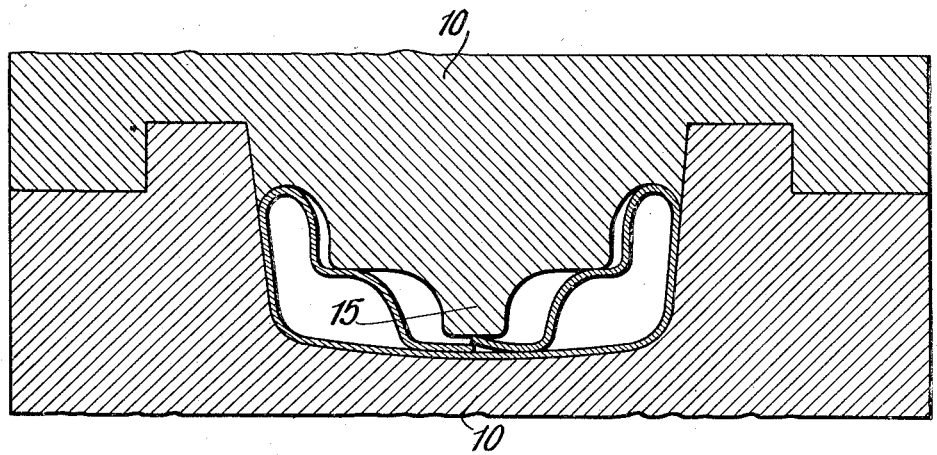

Alternatively instead of abutting the overlapped edges into contiguous contact by means of the rollers 10 I may provide that the said rollers have completed their function at the point illustrated in Fig. 4 and have thereby left one of the peripheral edges of the rim overlapping slightly or lying at an angle to the other in the base of the rim as shown at 15 in the drawings. Then the actual butting and seaming operation is carried out by the welding electrodes 11 as illustrated in Fig. 5 thereby insuring perfect continuity of the opposing peripheral edges 2 and 3.

In the rims electrically welded according to this invention, the construction illustrated in Fig. 1 in addition to facilitating the welding operation, further characterizes rims of the type described with comparatively great strength because a substantial length, transversely, of the base is fused homogeneously into the peripheral edges aforesaid. Thus, is formed a particularly efficient anchor for the tyre retaining edges which tends to prevent transverse distortion, or splaying apart, of the said edges. Further, the length of the weld, because it forms a solid circumferential band at the base of the rim of considerably greater strength than that of the gauge of the rim, also greatly stiffens the rim circumferentially and thereby tends to prevent radial distortion of the rim.

While, however, this construction facilitates the carrying out of the method according to this invention, and further, in conjunction therewith, provides a rim of greatly improved characteristics, it is not to be construed that the said invention is limited thereto.

While I have described my invention with particular reference to specific steps in the method and have referred to specific types of apparatus, it is not to be construed that I am limited thereto since various modifications may be made by those skilled in the art without departing from the invention as defined in the appended claims.

What I claim is:—

1. The method of manufacturing rims of the type described from a piece of sheet metal which includes bending the same to the required cross-section, compressing the peripheral edges against each other at the base of the rim and simultaneously electrically welding the same together and to the base of the rim while said edges are compressed together substantially as described.

2. The method of manufacturing rims which includes the following steps, rolling a strip of sheet metal to the required cross-sectional contour, pressing the peripheral edges into abutment with each other at the base of the rim and welding opposed edges of the rim blank together while they are so pressed together.

In witness whereof, I have hereunto signed my name.

WALLACE HENRY PAULL.